(No Model.)
H. H. HARPER.
HORSE DETACHER.
No. 423,760.  Patented Mar. 18, 1890.
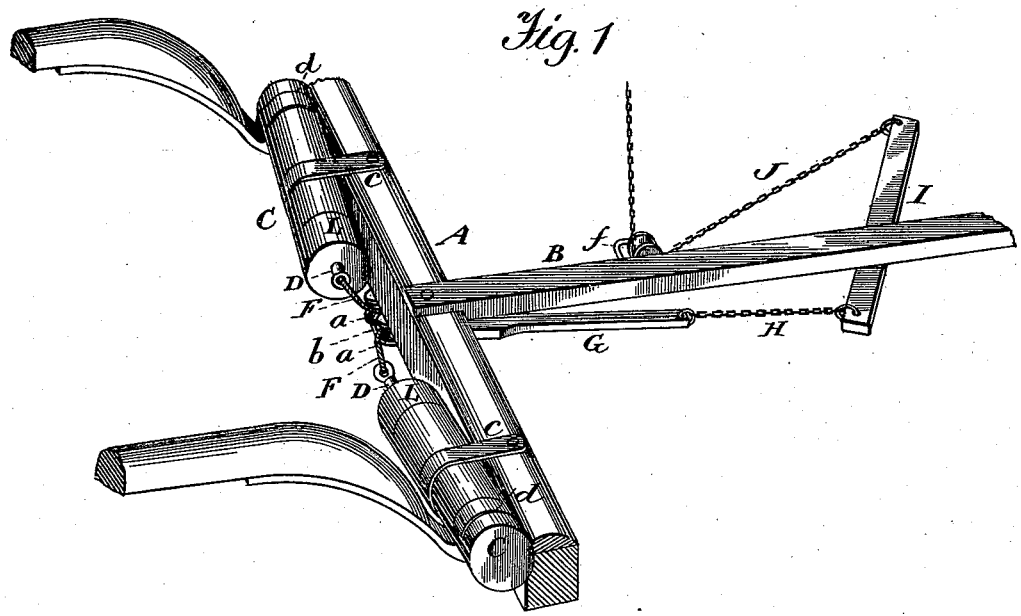
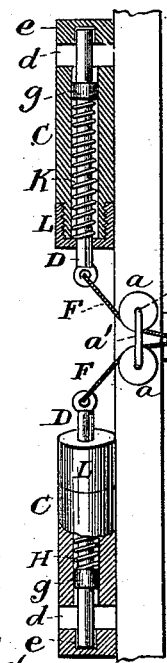
Witnesses.
A. Ruppott
Jos. B. Connolly
Inventor:
Henry H. Harper,
by Franklin H. Hough
his Attorney

UNITED STATES PATENT OFFICE.

HENRY HUGHES HARPER, OF BONHAM, TEXAS.

HORSE-DETACHER.

SPECIFICATION forming part of Letters Patent No. 423,760, dated March 18, 1890.

Application filed January 29, 1890. Serial No. 338,449. (No model.)

*To all whom it may concern:*

Be it known that I, HENRY HUGHES HARPER, a citizen of the United States, residing at Bonham, in the county of Fannin and State of Texas, have invented certain new and useful Improvements in Spring-Bolt Detachers for Vehicles; and I do declare the following to be a full, clear, and exact description of the invention, such as will enable others skilled in the art to which it appertains to make and use the same, reference being had to the accompanying drawings, and to the letters of reference marked thereon, which form a part of this specification.

This invention relates to certain new and useful improvements in horse-detaching devices of that class designed to permit of the detaching of the horse from the vehicle to which he is attached when occasion may require.

The invention has for its object, among others, to provide an improved device of this character, by the employment of which all danger of the horse becoming accidentally detached is avoided, and yet, when necessity requires, the parts may be actuated by the occupant of the vehicle, and when detached are so arranged as not to in any way interfere with the animal.

Other objects and advantages of the invention will hereinafter appear, and the novel features thereof will be specifically pointed out in the claims at the end of this specification.

The invention consists in the peculiar combinations and the novel construction, arrangement, and adaptation of parts, all as more fully hereinafter described, shown in the drawings, and claimed.

The invention is clearly illustrated in the accompanying drawings, which, with the letters of reference marked thereon, form a part of this specification, and in which—

Figure 1 is a perspective view illustrating my improvement as applied to a vehicle. Fig. 2 is a bottom plan with parts in section.

Like letters of reference indicate like parts in both figures of the drawings.

Referring now to the details of the drawings by letter, A designates the front axle and B the coupling pole or reach, which is designed to connect the front and rear axles in the usual manner. As the vehicle to which my device is to be attached may be of the ordinary and well-known form of construction, I have not shown any of the parts thereof except those with which my device is intimately connected. To the under side of the axle, substantially at its longitudinal center, there are attached the guide-rollers $a$ $a$, which are attached to the axle in the following manner: $b$ is a piece of wire or other suitable material, the ends of which are passed through suitable holes in the hubs of the pulleys or rollers and are then secured in the axle. Thus the single piece serves to secure the rollers in place, and the cross-portion $a'$ thereof serves as a guide to prevent dropping of the connecting-cord hereinafter described.

To the front face of the front axle there are secured, in any well-known way, the arms or cylinders C C, which in this instance are held to the axle by means of the straps $c$. These arms are held in an inclined position—that is, inclined from the ends of the axle toward the center thereof and downward, so as to enable me to run the connecting-cord beneath the axle out of the way without binding of the said cord. The outer ends of these arms are provided with the notches $d$ to receive the ends of the thills or the eyes thereon. Arranged within these arms are the pins D, which extend longitudinally thereof and loosely therein. They are of such length as to project across the notches in the ends of the arms and rest in bearings $e$ therefor in the extreme ends of the arms, as shown. The adjacent ends of these pins are extended beyond the ends of the arms, and to each extended end there is attached one end of a cord, rope, or chain F, which extends rearward between the guide-rollers $a$, over one of which each portion of the cord rides. The bight of this cord or chain has attached thereto, after it passes beyond the rollers, one end of a rod G, which works loosely, or it may be in guides if necessary, and has attached to its other end one end of the cord H, the other end of which is attached to the short arm of the lever I, which is pivoted to the under side of the reach, and has connected with its other end a cord, rope, or chain J, which passes over a roller affixed to the side of the reach on a horizontal pivot, and said pivot being so arranged as to form a cord-guide $f$. This cord is designed, after passing over this roller, to extend up through a hole in the bottom of the vehicle to within convenient reach of the occupant thereof. The pins within the arms are provided with shoulders $g$, against which the coiled springs K find one point of resistance, the other point of resistance being against the inner side of the removable cap L to the arm, the said springs being so arranged as to normally project the pins across the notches in the outer ends of the arms.

In practice the parts are normally in the position to project the pins across the notches in the ends of the arms, and the said pins then pass through the eyes or other appliances in the ends of the thills and thus hold them against displacement; but when it is desired to detach the horse it is only necessary to pull upon the cord or chain J, when the pins will be pulled toward the adjacent ends of the arms, away from the notches in the outer ends, and the thills will drop from their notches. As soon as pressure is removed from the inner ends of the pins the springs force them outward again.

Of course the device above described could be used equally as well with a pole for a double team as with thills for a single team, and I therefore do not intend to restrict myself to its employment with thills.

I deem it important that the arms or adjusters C be inclined downward and toward each other instead of being parallel with the axle, as by this arrangement I am enabled to run the cord beneath the axle, whereby it may be extended rearward in a straight line, avoiding bends and twists, and thus rendering the device easier to operate and more positive in its action.

What I claim as new is—

1. The combination, with the axle, of the arms attached to the front face thereof and inclined downward and toward each other, the spring-actuated pins within said arms, and the cord attached to the adjacent ends of the said pins and passed beneath the axle over guide-rollers and connected with a lever pivoted upon the under side of the reach, said lever being arranged to be actuated from the vehicle, as set forth.

2. The combination, with the axle and the arms attached thereto and inclined downward and toward each other, of the spring-actuated pins in said arms, the cord attached to the adjacent ends of said pins and passed over guide-rollers on the under side of the axle, the lever pivoted on the under side of the reach, the cord and arm connecting one end of the lever with the cord on the pins, and the cord attached to the other end of the lever and passed over a guide-roller and adapted to be actuated from the vehicle, substantially as described.

In testimony whereof I affix my signature in presence of two witnesses.

HENRY HUGHES HARPER.

Witnesses:
TURNER H. PERRY,
N. M. BALLARD.